Nov. 20, 1945. W. C. LEA 2,389,372
COLLET HOLDER
Filed Oct. 28, 1943
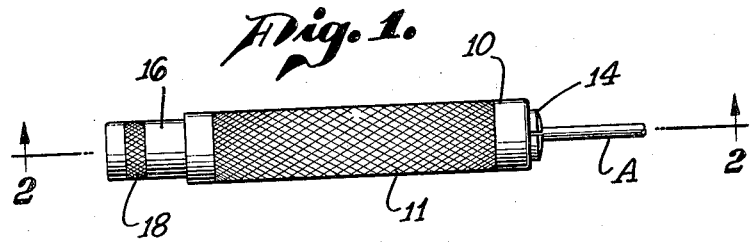
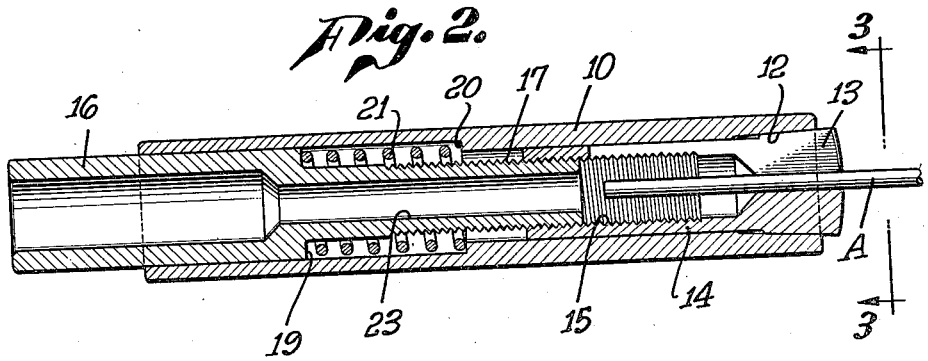
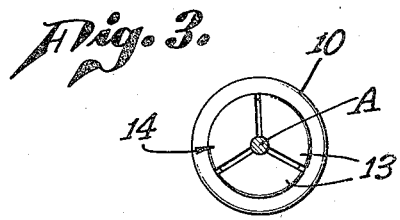
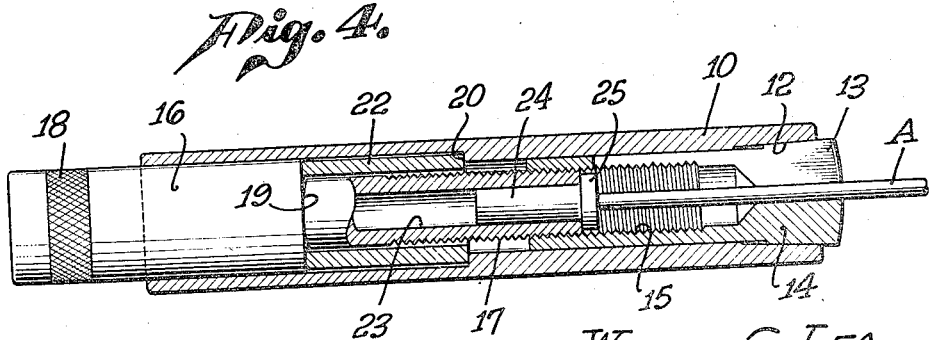
WILLIAM C. LEA,
INVENTOR.
BY *Hazard and Miller*
ATTORNEY.

Patented Nov. 20, 1945

2,389,372

UNITED STATES PATENT OFFICE 2,389,372

COLLET HOLDER

William C. Lea, Los Angeles, Calif.

Application October 28, 1943, Serial No. 507,942

1 Claim. (Cl. 279—53)

This invention relates to improvements in holding devices and may be termed a collet holder.

An object of the invention is to provide a device that will hold any one of a number of replaceable collets of various sizes and which will serve as a handle therefor enabling the collet to firmly grip any type of small article the size of which corresponds to the size of the collet employed. In many industries it is desirable to be able to firmly grip a small article, which article may either be worked on or may be a tool that is to be employed in working on other objects. It is desirable to be able to quickly insert the article into the collet and cause the collet to firmly grip the article. At the same time it is desirable to be able to instantly release the article and replace it with another article.

Another object of the invention is to provide a collet holder consisting of a sleeve constituting a handle adapted to receive any one of a number of replaceable collets, the sleeve having a seat for the collet and to provide an actuating means within the sleeve that is connectable to the collet, the actuating means projecting from the sleeve and being spring-actuated to cause the collet to normally contract whereby the collet will be normally maintained in gripping condition but may be caused to instantly release the gripped article on forcing the actuating means against the action of its spring.

Another object of the invention is to provide a collet holder consisting of a sleeve constituting a handle having a seat for a collet therein and having an actuating means within the sleeve connectable to the collet, the sleeve and actuating means having opposed shoulders with means for maintaining the opposed shoulders in spaced relation which means may optionally be a spring or a rigid spacer whereby in the event that an extremely hard grip on the article is desired which is greater than that which is capable of being created by the spring. The rigid spacer may be employed to secure the required mechanical advantage.

Another object of the invention is to provide a collet holder having the above-mentioned characteristics wherein the actuating means is tubular having a bore coaxial with the center of the collet enabling articles held to extend therethrough and to provide means for optionally closing the bore for a purpose hereinafter to be described.

With the foregoing and other objects in view, which will be made manifest in the following detailed description and specifically pointed out in the appended claim, reference is had to the accompanying drawing for an illustrative embodiment of the invention, wherein:

Figure 1 is a view in side elevation of the collet holder embodying the present invention;

Fig. 2 is a longitudinal section through the same;

Fig. 3 is a view taken substantially upon the line 3—3 upon Fig. 2 in the direction indicated; and Fig. 4 is a view similar to Fig. 2, but illustrating modifications as having been incorporated.

Referring to the accompanying drawing wherein similar reference characters designate similar parts throughout, the improved collet holder comprises an outer sleeve 10, preferably externally knurled as indicated at 11 so that it may constitute a suitable handle. This sleeve has adjacent one end a tapered seat 12 engageable by the jaws 13 of a collet, generally indicated at 14, longitudinally divided so as to preferably form three jaws as indicated in Fig. 3 in conformity with conventional collets. The present holder is designed to receive any one of a number of different collets that differ in size from each other. It is internally threaded as indicated at 15.

Within the sleeve 10 there is disposed an actuator 16 having an externally threaded portion 17 that may be screwed into the threads 15 on the collet. This actuator projects from the other end of sleeve 10 and the projecting portion may be knurled as at 18 to facilitate its being turned so as to screw it into the collet. On the actuator there is an external shoulder 19 arranged in opposition to an internal shoulder 20 on the interior of the sleeve. A coil compression spring 21 is disposed between these shoulders and is normally under compression.

The operation and advantages of the above-described construction are as follows:

The compression of spring 21 urges the actuator 16 toward the left as viewed in Fig. 2, so that it will draw the collet 14 into engagement with its seat 12 so as to grip any article A that may be inserted between the jaws of the collet. As the taper of the seat 12 is slight usually being in the neighborhood of a 3° angle, the jaws will be normally urged to contract about the article A and firmly hold it in position. If it is desired to replace article A with some other article this can easily be accomplished by forcing the projecting end of the actuator 16 inwardly with respect to the sleeve 10, thus overcoming the compression exerted by spring 21. As the collet is thus unseated its jaws will automatically expand or loosen with respect to the article and the article A can thus be removed and another article quickly substituted while the jaws are held in expanded position. Release of the actuator 16 allows spring 21 to again become effective to cause the actuator to draw the collet against its seat and contract firmly upon the article. The degree to which the collet will be caused to grip on the article can be somewhat adjusted by the extent to which the actuator is screwed into the collet. Varying the extent to which the actuator is screwed into the collet will affect the compression of the spring. However, if it is desired to cause the collet to grip upon article A to a greater extent than that afforded by the compression of spring 21 the spring 21 may be quickly removed and replaced by a solid bushing 22 that is interposed between the shoulders 19 and 20 and maintains these shoulders in spaced relation. When the bushing 22 is employed rotation of the actuator 16 relative to sleeve 10 causes it to screw into the collet and the collet is consequently drawn against its seat 12 with great mechanical advantage. Consequently the jaws will be caused to grip upon the article A with great force.

In the construction illustrated the actuator is preferably tubular in form having a bore 23 therethrough so that if the article A is lengthy or if it is in the form of a continuous wire that is fed from left to right through the actuator and through the collet the bore will serve to accommodate it. In some instances, however, it is desirable to provide a backing for the end of the article in the event that it is to be thrust upon with considerable force. To this end, I provide a removable closure 24 having a shank receivable in the threaded end of the actuator and having a head 25 adapted to be positioned against the forward end of the actuator. With this temporary closure in place, if the article A should be a screwdriver for example, the shank of the screwdriver may be positioned against the closure, as shown in Fig. 4, and the closure will serve to prevent slipping of the article longitudinally between the collet jaws in the event that the screwdriver is thrust upon with considerable force. It will be understood that the temporary closure 24 need not be employed only with the bushing 22 as illustrated in Fig. 4, but that it may optionally be employed in the holder in conjunction with spring 21.

From the above-described construction it will be appreciated that the improved holder permits of quick and easy insertion of articles A to be gripped, and when the spring 21 is employed it enables these articles to be automatically gripped upon release of the actuator 16. Whenever it is desired to replace article A the collet can be caused to instantly release by forcing the actuator 16 forwardly. In the event that the spring will not cause the collet to grip the article sufficiently it may be easily replaced with the bushing 22 and under either circumstance, the replaceable closure 24 may be employed if desired. The parts of the holder are easily and quickly assembled and disassembled facilitating the removal and replacement of a collet with another collet of different size making the holder susceptible of a wide variety of uses.

Various changes may be made in the details of construction without departing from the spirit and scope of the invention as defined by the appended claim.

I claim:

A collet holder comprising a tubular body having a cylindrical axial bore therethrough the forward end of which is tapered correspondingly to the external taper of a collet, a contractible collet having a cylindrical portion fitting the cylindrical portion of the bore and having an externally tapered head adapted to be drawn against the tapered interior of the body, the rear end of the body being internally enlarged to provide a rearwardly facing shoulder, an actuator fitting the internally enlarged portion of the body and projecting rearwardly from the body, the forward end of the actuator being externally reduced providing a forwardly facing shoulder and being threaded into the rear of the collet, and a compression spring disposed between the shoulders and around the forwardly extending portion of the actuator, the actuator being tubular from end to end thereof, and a stop having a shank receivable in the forward end of the actuator and a head adapted to abut against the forward end of the actuator within the collet for limiting the extent to which articles may be inserted through the collet.

WILLIAM C. LEA.